United States Patent
Panchal et al.

(10) Patent No.: US 11,401,798 B2
(45) Date of Patent: Aug. 2, 2022

(54) PROCESS FOR REAL TIME GEOLOGICAL LOCALIZATION WITH STOCHASTIC CLUSTERING AND PATTERN MATCHING

(71) Applicant: SHELL OIL COMPANY, Houston, TX (US)

(72) Inventors: Neilkunal Panchal, Houston, TX (US); Sami Mohammed Khair Sultan, Houston, TX (US); Mingqi Wu, Sugar Land, TX (US)

(73) Assignee: SHELL USA, INC., Houston, TX (US)

( * ) Notice: Subject to any disclaimer, the term of this patent is extended or adjusted under 35 U.S.C. 154(b) by 0 days.

(21) Appl. No.: 17/264,005

(22) PCT Filed: Jul. 30, 2019

(86) PCT No.: PCT/US2019/044046
§ 371 (c)(1),
(2) Date: Jan. 28, 2021

(87) PCT Pub. No.: WO2020/028305
PCT Pub. Date: Feb. 6, 2020

(65) Prior Publication Data
US 2021/0293133 A1    Sep. 23, 2021

Related U.S. Application Data

(60) Provisional application No. 62/712,625, filed on Jul. 31, 2018.

(30) Foreign Application Priority Data

Sep. 14, 2018   (EP) .................................... 18194493

(51) Int. Cl.
*E21B 7/04* (2006.01)
*E21B 47/0224* (2012.01)
(Continued)

(52) U.S. Cl.
CPC ............ *E21B 47/0224* (2020.05); *E21B 7/04* (2013.01); *G01V 1/282* (2013.01); *G01V 3/18* (2013.01); *G01V 11/00* (2013.01)

(58) Field of Classification Search
CPC .......... G01V 1/282; G01V 11/00; G01V 3/18; E21B 47/022; E21B 47/0224; E21B 7/04
(Continued)

(56) References Cited

U.S. PATENT DOCUMENTS

2009/0125238 A1* 5/2009 Barboza ................... E21B 49/00
                                                                         702/11
2009/0187391 A1* 7/2009 Wendt ...................... G01V 11/00
                                                                         703/7
(Continued)

FOREIGN PATENT DOCUMENTS

WO     2020072120 A2    4/2020

OTHER PUBLICATIONS

International Search Report and Written Opinion Received for PCT Application No. PCT/US2019/044046, dated Oct. 9, 2019, 12 pages.
(Continued)

*Primary Examiner* — Jeffrey P Aiello
(74) *Attorney, Agent, or Firm* — Shell USA, Inc.

(57) ABSTRACT

A method of geosteering in a wellbore construction process uses an earth model that defines boundaries between formation layers and petrophysical properties of the formation layers in a subterranean formation. Sensor measurements related to the wellbore construction process are inputted to the earth model. An estimate is obtained for a relative geometrical and geological placement of the well path with respect to a geological objective using a trained stochastic clustering and pattern matching agent. An output action
(Continued)

based on the sensor measurement for influencing a future profile of the well path with respect to the estimate.

15 Claims, 2 Drawing Sheets

(51) Int. Cl.
  *G01V 1/28* (2006.01)
  *G01V 3/18* (2006.01)
  *G01V 11/00* (2006.01)

(58) Field of Classification Search
  USPC ......... 33/304; 73/152.01–152.3; 166/250.01, 166/255.2; 175/24, 40, 45, 50, 57; 324/303, 323, 339; 367/25, 38, 73; 702/2, 6–7, 9, 11, 13, 16; 703/2, 5, 10
  See application file for complete search history.

(56) References Cited

U.S. PATENT DOCUMENTS

| | | | |
|---|---|---|---|
| 2011/0010140 A1* | 1/2011 | Hoitsma | G06F 17/18 703/2 |
| 2011/0213600 A1* | 9/2011 | Strebelle | G01V 99/005 703/10 |
| 2011/0231164 A1* | 9/2011 | Zhang | G01V 99/005 703/2 |
| 2013/0144575 A1* | 6/2013 | Seyhan | H02J 3/14 703/2 |
| 2013/0289962 A1* | 10/2013 | Wendt | G01V 11/00 703/10 |
| 2015/0331123 A1* | 11/2015 | Guigne | G01V 1/28 702/16 |
| 2019/0064389 A1* | 2/2019 | Denli | G06N 3/08 |
| 2019/0302310 A1 | 10/2019 | Fox et al. | |

OTHER PUBLICATIONS

Zhang et al., "TST3D: Automated Structural Interpretation in Horizontal Wellbores(URTeC: 2889444)", Proceedings of the 6th Unconventional Resources Technology Conference, Jul. 23, 2018, pp. 1-15, XP05556537.

Obiwanne et al., Application of Artificial Intelligence Techniques in Drilling System Design and Operations: A State of the Art Review and Future Research Pathways (SPE-184320-MS), SPE Nigeria Annual International Conference and Exhibition, Aug. 2, 2016, pp. 1-22, XP055565385.

Pollock et al., "Machine Learning for Improved Directional Drilling (OTC-28633-MS)", Offshore Technology Conference, Apr. 30, 2018, pp. 1-9, XP055564922.

Winkler, "Geosteering by Exact Inference on a Bayesian Network", Geophysics, vol. 82, Issue No. 5, Sep.-Oct. 2017, D279-D291.

Metropolis et al., "Equation of State Calculations by Fast Computing Machines", Journal of Chemical Physics, vol. 21, 1953, pp. 1087-1092.

Hastings, "Monte Carlo sampling methods using Markov chains and their applications", Biometrika, vol. 57, Issue No. 1, p. 97 to 109.

Liang et al., "Stochastic Approximation in Monte Carlo Computation", Journal of the American Statistical Association, Jun. 26, 2006, 36 pages.

* cited by examiner

PROCESS FOR REAL TIME GEOLOGICAL LOCALIZATION WITH STOCHASTIC CLUSTERING AND PATTERN MATCHING

CROSS REFERENCE TO RELATED APPLICATIONS

The present application is a National Stage (§ 371) of International Application No. PCT/US2019/044046, filed Jul. 30, 2019, which claims the benefit of U.S. Provisional Application No. 62/712,625, filed Jul. 31, 2018, which is incorporated herein by reference.

FIELD OF THE INVENTION

The present invention relates to the field of geosteering and, in particular, to a process for real time geological localization with stochastic clustering and pattern matching for automating geosteering.

BACKGROUND OF THE INVENTION

In a well construction process, rock destruction is guided by a drilling assembly. The drilling assembly includes sensors and actuators for biasing the trajectory and determining the heading in addition to properties of the surrounding borehole media. The intentional guiding of a trajectory to remain within the same rock or fluid and/or along a fluid boundary such as an oil/water contact or an oil/gas contact is known as geosteering.

The objective in drilling wells is to maximize the drainage of fluid in a hydrocarbon reservoir. Multiple wells placed in a reservoir are either water injector wells or producer wells. The objective is maximizing the contact of the wellbore trajectory with geological formations that: are more permeable, drill faster, contain less viscous fluid, and contain fluid of higher economical value. Furthermore, drilling more tortuous wells, slower, and out of zone add to the costs of the well.

Geosteering is drilling a horizontal wellbore that ideally is located within or near preferred rock layers. As interpretive analysis is performed while or after drilling, geosteering determines and communicates a wellbore's stratigraphic depth location in part by estimating local geometric bedding structure. Modern geosteering normally incorporates more dimensions of information, including insight from downhole data and quantitative correlation methods. Ultimately, geosteering provides explicit approximation of the location of nearby geologic beds in relationship to a wellbore and coordinate system.

Geosteering relies on mapping data acquired in the structural domain along the horizontal wellbore and into the stratigraphic depth domain. Relative Stratigraphic Depth (RSD) means that the depth in question is oriented in the stratigraphic depth direction and is relative to a geologic marker. Such a marker is typically chosen from type log data to be the top of the pay zone/target layer. The actual drilling target or "sweet spot" is located at an onset stratigraphic distance from the top of the pay zone/target layer.

In an article by H. Winkler ("Geosteering by Exact Inference on a Bayesian Network" Geophysics 82:5:D279-D291; September-October 2017), machine learning is used to solve a Bayesian network. For a sequence of log and directional survey measurements, and a pilot well log representing a geologic column, a most likely well path and geologic structure is determined.

There remains a need for autonomous geosteering processes with improved accuracy.

SUMMARY OF THE INVENTION

According to one aspect of the present invention, there is provided a method of geosteering in a wellbore construction process, the method comprising the steps of: providing an earth model defining boundaries between formation layers and petrophysical properties of the formation layers in a subterranean formation comprising data selected from the group consisting of seismic data, data from an offset well and combinations thereof; comparing sensor measurements related to the wellbore construction process to the earth model; obtaining an estimate from the earth model for a relative geometrical and geological placement of the well path with respect to a geological objective using a trained stochastic clustering and pattern matching agent; and determining an output action based on the sensor measurement for influencing a future profile of the well path with respect to the estimate.

BRIEF DESCRIPTION OF THE DRAWINGS

The method of the present invention will be better understood by referring to the following detailed description of preferred embodiments and the drawings referenced therein, in which.

DETAILED DESCRIPTION OF THE INVENTION

Figure 1A:
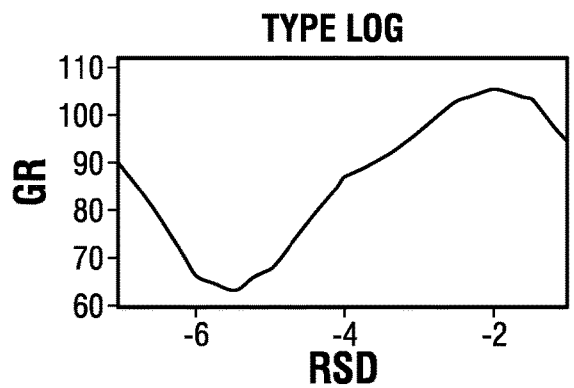
FIG. 1 is a graphical representation of a motivation for the method of the present invention comparing type log vs. well log data.
Figure 1D:
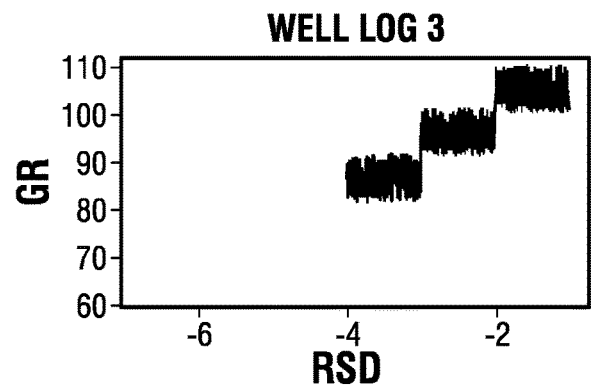
Figure 1B:
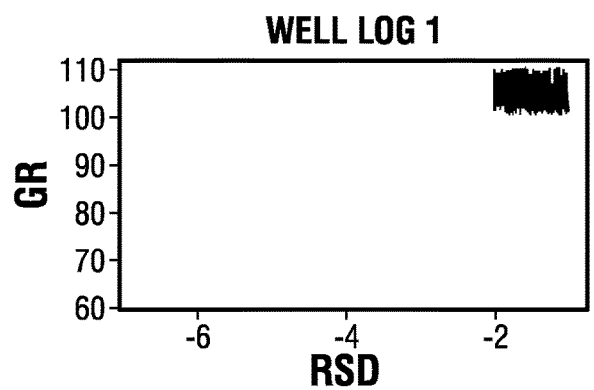
Figure 1E:
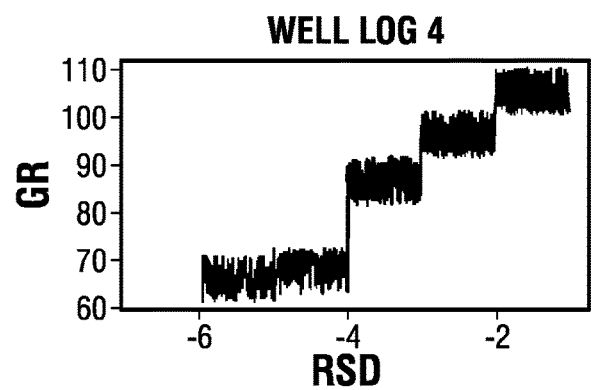
Figure 1C:
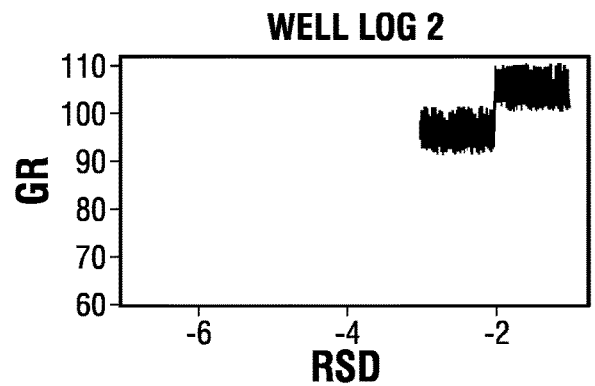
Figure 1F:
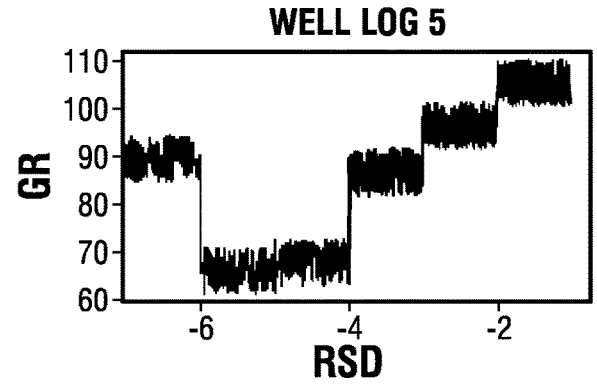

The present invention provides a method for geosteering in a wellbore construction process. A wellbore construction process can be a wellbore drilling process. The method is advantageously conducted while drilling. The method uses a trained stochastic clustering and pattern matching (SCPM) agent. The method is a computer-implemented method.

In accordance with the present invention, an earth model is provided. The earth model defines boundaries between formation layers and petrophysical properties of the formation layers of a subterranean formation. The earth model is produced from data relating to a subterranean formation, the data selected from the group consisting of seismic data, data from an offset well and combinations thereof. Preferably, the earth model is a 3D model.

The earth model may be a static or dynamic model. Preferably, the earth model is a dynamic model that changes dynamically during the drilling process.

Sensor measurements are inputted to the earth model. The sensor measurements are obtained during the wellbore construction process. Accordingly, real-time sensor measurements are made while drilling. In a real-time drilling process, sensors are chosen based on the geological objectives. if the target reservoir and the surrounding medium can be distinguished by a particular measurement, then this measurement will be chosen. Since there is a limit of the telemetry rate, the sample frequency would also be budgeted. Preferably, the sensor measurements are provided as a streaming sequence. The sensors may be LWD sensors, MWD sensors, image logs, 2D seismic data, 3D seismic data and combinations thereof.

The LWD sensor may be selected from the group consisting of gamma-ray detectors, neutron density sensors, porosity sensors, sonic compressional slowness sensors, resistivity sensors, nuclear magnetic resonance, and combinations thereof.

The MWD sensor is selected from the group consisting of sensors for measuring mechanical properties, inclination, azimuth, roll angles, and combinations thereof.

The earth model simulates the earth and then a sensor measurement from the earth. The simulated sensor measurement is then compared to an actual sensor measurement made while drilling.

A well path is selected to reach a geological objective, such as a geological feature, such as fault, a nearby offset well, a fluid boundary and the like. Examples of fluid boundaries may be oil/water contacts, oil/gas contacts, oil/tar contacts, and the like. An estimate for the relative geometrical and geological placement of a well path to reach the geological objective is obtained using a trained SCPM agent. An output action based on the sensor measurement for influencing a future profile of the well path is determined with respect to the estimate.

In a preferred embodiment, the relative geometrical and geological placement of the well profile is determined by a relative stratigraphic depth (RSD). In this embodiment, the trained SCPM agent matches clustered sensor measurements for the relative stratigraphic depth to a reference measurement with a predetermined set of clusters to discretize the signal for the RSD. A maximum a posteriori probability discretized signal for the RSD is maximized with respect to regularization related to admissible and plausible transitions between adjacent depths and relative geological positions.

A most probable sequence of relative stratigraphic depths is solved by a sampling method selected from the group consisting of mean field, Metropolis-Hastings, Gibbs sampling, Markov chain Monte Carlo and combinations thereof. Preferably, multiple threads of solutions with different initial conditions are solved asynchronously to avoid a local minimum where the most optimal trajectory of the well path is selected.

In a preferred embodiment, the output action of the SCPM agent is determined by maximizing the placement of the well path with respect to a geological datum. An objective is maximizing the contact of the wellbore trajectory with geological formations that: are more permeable, drill faster, contain less viscous fluid, and contain fluid of higher economical value. The geological datum can be, for example, without limitation, a rock formation boundary, a geological feature, an offset well, an oil/water contact, an oil/gas contact, an oil/tar contact and combinations thereof.

The steering of the wellbore trajectories is achieved through a number of different actuation mechanisms, including, for example, rotary steerable systems (RSS) or positive displacement motors. The former contains downhole actuation, power generation feedback control and sensors, to guide the bit by either steering an intentional bend in systems known as point-the-bit or by applying a sideforce in a push-the-bit system. PDM motors contain a fluid actuated Moyno motor that converts hydraulic power to rotational mechanical power for rotating a bit. the motor contains a bend such that the axis of rotation of the bit is offset from the centerline of the drilling assembly. Curved boreholes are achieved through circulating fluid through the motor and keeping the drill-string stationary. Curved boreholes are achieved through rotating the drill string whilst circulating such that the bend cycle averages to obtain a straight borehole.

The output action can be curvature, roll angle, set points for inclination, set points for azimuth, Euler angle, rotation matrix quaternions, angle axis, position vector, position Cartesian, polar, and combinations thereof.

Figure 2:
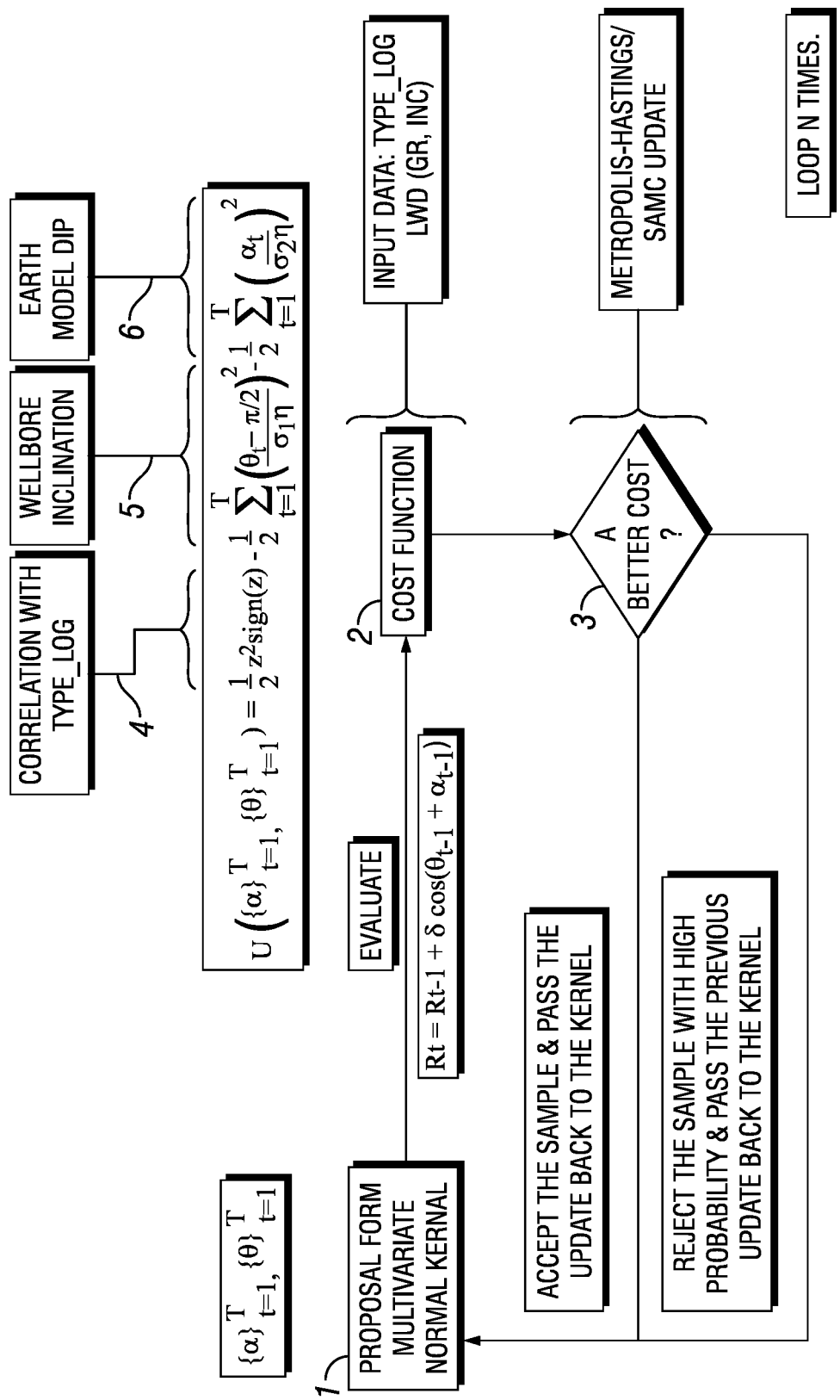
FIG. 2 is a work flow of one embodiment of the method of the present invention.

Referring now to FIG. 2, illustrating a work flow of one embodiment of the present invention, an initial solution is given by a proposal distribution 1. This is a joint distribution representing an initial guess of the positioning of the wellbore relative to the stratigraphy. In a non-limiting embodiment this is represented as a multivariate normal distribution.

A cost function 2 consists of a combination of: correlation with type log, deviation from position and deviation from attitude. The purpose of the cost function is to evaluate the sampled solution. A sampled solution 3, once evaluated by the cost function 2, is either accepted or rejected based on a threshold. If accepted, the parameters of the kernel, which is the joint distribution 1, is updated. A representation of the earth model is used in the objective function at 4. This is a discretized version of a 1D type log. A wellbore inclination 5, representing the heading with respect to vertical, is taken as input to the objective function. Prior knowledge of the formation dip angle is taken as input to the cost function at 6.

Preferably, the SCPM agent is trained using a simulation environment, more preferably using a simulation environment produced in accordance with the method described in "Method for Simulating a Coupled Geological and Drilling Environment" filed in the USPTO on the same day as the present application, as provisional application U.S. 62/712,490 filed 31 Jul. 2018, the entirety of which is incorporated by reference herein.

For example, the SCPM agent may be trained by (a) providing a training earth model defining boundaries between formation layers and petrophysical properties of the formation layers in a subterranean formation comprising data selected from the group consisting of seismic data, data from an offset well and combinations thereof, and producing a set of model coefficients; (b) providing a toolface input corresponding to the set of model coefficients to a drilling attitude model for determining a drilling attitude state; (c) determining a drill bit position in the subterranean formation from the drilling attitude state; (d) feeding the drill bit position to the training earth model, and determining an updated set of model coefficients for a predetermined interval and a set of signals representing physical properties of the subterranean formation for the drill bit position; (e) inputting the set of signals to a sensor model for producing at least one sensor output and determining a sensor reward from the at least one sensor output; (f) correlating the toolface input and the corresponding drilling attitude state, drill bit position, set of model coefficients, and the at least one sensor output and sensor reward in the simulation environment; and (g) repeating steps b)-f) using the updated set of model coefficients from step d).

The drilling model for the simulation environment may be a kinematic model, a dynamical system model, a finite element model, and combinations thereof.

The method of the present invention seeks to find a trajectory of a RSD such that the clustered gamma ray (according to the value of RSD) matches with the reference gamma ray, i.e., type logs. In the following, $Z_t$ and X denote the RSD and gamma ray of the type logs, respectively, while $Z_w$ and Y denote the estimated RSD and the observed gamma ray of the well logs, respectively.

Since X and Y are often of different lengths, their similarity cannot be measured directly. The present inventors have surprisingly found that they can overcome this problem by following method. $Z_{min}$ and $Z_{max}$ denote the minimum and maximum possible values of RSD, respectively, while δ is a predetermined group width for the RSD. The set of steps in type logs and well logs are represented by $S_t = \{1, 2, \ldots, T_t\}$ and $S_w = \{1, 2, \ldots, T_w\}$. $Z_t^{(i)}$ is the RSD of the type logs at step i and $Z_w^{(i)}$ is the estimated RSD of the well logs at step i. $X_i$ and $Y_i$ are the gamma ray of type logs and well logs, respectively, at step i.

The well log RSD is parameterized as follows:

$$Z_w^{(i)} = Z_w^{(i-1)} + (\rho \sin(\pi(a_i - 90)/180) + b_i)$$

for $i = 1, 2, \ldots, T_w$, where $\rho$ is a predetermined value, the so-called moving scale, and $a_i$ and $b_i$ are parameters. The parameter vector $\theta = \{(a_1, b_1), \ldots, (a_{Tw}, b_{Tw})\}$ is determined through minimizing the cost function defined below.

1. Group the values of X according to the value of $Z_t$ by setting $R_1 = \{X_i : Z_{min} \le Z_t^{(i)} < Z_{min} + \delta, i \in S_t\}$, $R_2 = \{X_i : Z_0 + \delta \le Z_r^{(i)} < Z_0 + 2\delta, i \in S_t\}, \ldots, R_K = \{X_i : Z_{max} - \delta \le Z_t^{(i)} \le Z_{max}\}$. Calculate the averaged gamma ray value for all bins, and denote the average values by $\dot{X}_b^{(1)} \ldots \dot{X}_b^{(K)}$ and $\dot{X}_b = (\dot{X}_{b_1}^{(k)} \ldots \dot{X}_{b_2}^{(k)})$.
2. Group the values of Y according to the value of $Z_w$ by setting $W_1 = \{Y_i : Z_{min} \le Z_w^{(i)} < Z_{min} + \delta, i \in S_w\}$, $W_2 = \{Y_i : Z_{min} + \delta \le Z_w^{(i)} \le Z_{min} + 2\delta, i \in S_w\}, \ldots, W_K = \{Y_i : Z_{max} - \delta \le Z_w^{(i)} \le Z_{max}\}$. Calculate the averaged gamma ray value for all non-empty bins, and denote the average values by $\dot{Y}_{b_1}^{(k)} \ldots \dot{Y}_{b_2}^{(k)}$ and $\dot{Y}_b = (\dot{Y}_{b_1}^{(k)} \ldots \dot{Y}_{b_2}^{(k)})$.
3. Normalize $\dot{X}_{b_1}^{(k)} \ldots \dot{X}_{b_2}^{(k)}$ by setting $$\overline{X}_{bn}^{(kj)} = \overline{X}_b^{(kj)} \bigg/ \sqrt{\sum_{j=k_1}^{k_2} \overline{X}_b^{(j)} / (k_2 - k_1 + 1)},$$

for $j = k_1, \ldots, k_2$. Let $\overline{X}_{bn} = (\overline{X}_{bn}^{(k_1)}, \ldots, \overline{X}_{bn}^{(k_2)})$.

4. Normalize $\dot{Y}_{b_1}^{(k)} \ldots \dot{Y}_{b_2}^{(k)}$ by setting $$\overline{Y}_{bn}^{(kj)} = \overline{Y}_b^{(kj)} \bigg/ \sqrt{\sum_{j=k_1}^{k_2} \overline{Y}_b^{(j)} / (k_2 - k_1 + 1)},$$

for $j = k_1, \ldots, k_2$. Let $\overline{Y}_{bn} = (\overline{X}_{bn}^{(k_1)}, \ldots, \overline{X}_{bn}^{(k_2)})$.

5. Calculate the cosine similarity score: $z_\theta = 0.5 \log((1 + r_\theta)/(1 - r_\theta))$, where $r_\theta = \cos(\dot{X}_b, \dot{Y}_b)$.
6. Calculate the cost function $$U(\theta) = \frac{1}{2} z_g^2 \operatorname{sign}(z_\theta) - \lambda \sum_{j=k_1}^{k_2} |\overline{X}_{bn}^{(j)} - \overline{Y}_b^{(j)}| - \frac{1}{2} \sum_{i=1}^{T_w} \left(\frac{a_i - 90}{\sigma_1 T_w}\right)^2 - \frac{1}{2} \sum_{i=1}^{T_w} \left(\frac{b_i}{\sigma_2 T_w}\right)^2,$$

where $\lambda$, $\sigma_1$ and $\sigma_2$ are tunable parameters.

The cost function $U(\theta)$ can then be minimized by sampling from the density function $$\pi(\theta) \propto \exp(-U(\theta)/t),$$

using the Stochastic Approximation Monte Carlo (SAMC) algorithm, where t is called the temperature. FIG. 1 illustrates the motivation of this method.

Sampling from high dimensional distribution is challenging due to the high likelihood of existence of multi-modes. The most popular Markov chain Monte Carlo (MCMC) sampler Metropolis-Hastings (MH) algorithm (Metropolis and Teller, "Equation of state calculations by fast computing machines" Journal of Chemical Physics, 21; 1953) and (Hastings, "Monte Carlo sampling methods using Markov chains and their applications" Biometrika, 57; 1970) is prone to becoming trapped in local mode. To overcome the local-trap problem, Liang (F. Liang and Carroll, "Stochastic approximation in Monte Carlo computation" Journal of the American Statistical Association 102; 2007) has proposed a SAMC algorithm, which is a powerful tool to effectively sample from high dimension. The basic idea of SAMC can be described as follows. Suppose that there is interest in sampling from a distribution, $$f(x) = c\psi(x), x \in \chi$$

where $\chi$ is the sample space and c is an unknown constant. Let $E_1, \ldots E_k$ denotes a partition of $\chi$, and let $$\omega_i = \int_{E_i} \psi(x) dx \text{ for } i = 1, \ldots, k.$$

SAMC seeks to draw samples from the trial distribution $$f_w(x) \propto \sum_{i=1}^{k} \frac{\pi_i \psi(x)}{w_i} I(x \in E_i)$$

where $\pi_i$'s are predetermined constants such that $\pi_i > 0$ for all i and $$\Sigma_{i=1}^k \pi_i = 1,$$

which define the desired sampling frequency for each of the subregions. If $w_1, \ldots w_k$ are known, sampling from $f_w(x)$ will result in a random walk in the space of subregions (by regarding each subregion as a point) with each subregion being sampled with a frequency proportional to $\pi_i$. Hence, the local-trap problem can be overcome essentially, provided that the sample space is partitioned appropriately. The success of SAMC depends on whether $w_i$'s can be well estimated. SAMC provides a systematic way to estimate $w_i$ in an online manner. Let $\theta_{ti}$ denote the working estimate of $\log(w_i/\pi_i)$ obtained at iteration t, and let $\theta_t = (\theta_{t1}, \ldots, \theta_{tk}) \in \theta$, where $\theta$ denotes a compact set. Let $\gamma_t$ be a positive, nondecreasing sequence satisfying $$(i) \sum_{i=1}^{\infty} \gamma_t = \infty, \quad (ii) \sum_{i=1}^{\infty} \gamma_t^\zeta < \infty$$

for any $\zeta > 1$. For example, one may set $$\gamma_t = \frac{T_0}{\max(T_0, t)}, t = 1, 2, \ldots$$

for some value $T_0 > 1$. Under the above setting, one iteration of SAMC consists of the following steps:
1. Metropolis-Hastings (MH) sampling: simulate a sample $x_t$ by a single MH update with the invariant distribution $$f_{\theta_t}(x) \propto \sum_{i=1}^{k} \frac{\psi(x)}{e^{\theta_{ti}}} I(x \in E_i)$$

2. Weight updating: set
where $e_t=(e_{t1}, \ldots, e_{t,k})$ and $e_{t,i}=1$ if $x_t \in E_i$ and 0 otherwise. If $\theta^* \in \theta$, set $\theta_{t+1}=\theta^*$;
otherwise set $\theta_{t+1}=\theta^*+C^*$, where $C^*=(c^*, \ldots, c^*)$ can be an arbitrary vector which satisfies the condition $\theta^*+C^* \in \theta$. Note that $f_{\theta(x)}$ is invariant to this location transformation of $\theta^*$.

A remarkable feature of SAMC is its self-adjusting mechanism, which operates based on past samples. This mechanism penalizes the over-visited subregions and rewards the under-visited subregions, and thus enables the system to escape from local traps very quickly. Mathematically, if a subregion i is visited at time t, $\theta_{t+1,i}$ will be updated to a larger value $\theta_{t+1,i} \leftarrow \theta_{t,i} + \gamma_{t+1}(1-\pi_i)$, such that, this subregion has a smaller probability to be visited in the next iteration. On the other hand, for those regions, $j(j \neq i)$, not visited this iteration, $\theta_{t+1,j}$ will decrease to a smaller value, $\theta_{t+1,j} \leftarrow \theta_{t,j} - \gamma_{t+1}(\pi_j)$, such that, the chance to visit these regions will increase in the next iteration. This mechanism enables the system to escape from local traps very quickly. This is very effective for sampling from high dimensional systems with multiple modes.

In accordance with the method of the present invention, there are two parameters, inclination angle and formation dipping angle, at each sampling step from well logs. Therefore, the number of parameters is approximate to two times of the sampling steps from well logs. With this relative high dimensional problem, SAMC is used to sample from the posterior distribution.

While preferred embodiments of the present disclosure have been described, it should be understood that various changes, adaptations and modifications can be made therein without departing from the spirit of the invention(s) as claimed below.

We claim:

1. A method of geosteering based on a geological objective in a wellbore construction process, the method comprising the steps of:
   (i) providing an earth model defining boundaries between formation layers and petrophysical properties of the formation layers in a subterranean formation comprising data selected from the group consisting of seismic data, data from an offset well and combinations thereof;
   (ii) using the earth model to simulate a sensor measurement related to the geological objective;
   (iii) comparing the simulated sensor measurement to an acquired sensor measurement to obtain an estimate from the earth model for a relative geometrical and geological placement of the well path with respect to the geological objective using a trained stochastic clustering and pattern matching agent;
   (iv) revising a geometrical placement a future well path based on the earth model estimate; and
   (v) iterating on steps (ii) to (iv) for real-time geosteering in the wellbore construction process.

2. The method of claim 1, wherein the relative geometrical and geological placement of the well path is determined by a relative stratigraphic depth, and wherein the trained stochastic clustering and pattern matching agent matches clustered sensor measurements for the relative stratigraphic depth to a reference measurement with a predetermined set of clusters to discretize the signal for the relative stratigraphic depth.

3. The method of claim 2, wherein a maximum a posteriori probability discretized signal for the relative stratigraphic depth is maximized with respect to regularization related to admissible and plausible transitions between adjacent depths and relative geological positions.

4. The method of claim 2, wherein a most probable sequence of relative stratigraphic depths is solved by a sampling method selected from the group consisting of mean field, Metropolis-Hastings, Gibbs sampling, Markov chain Monte Carlo and combinations thereof.

5. The method of claim 4, wherein multiple threads of solutions with different initial conditions are solved asynchronously to avoid a local minimum where the most optimal trajectory of the well path is selected.

6. The method of claim 1, wherein the earth model is a static model.

7. The method of claim 1, wherein the earth model is a dynamic model that changes dynamically during the wellbore construction process.

8. The method of claim 1, wherein the acquired sensor measurements are provided as a streaming sequence.

9. The method of claim 1, wherein the acquired sensor measurements are measurements obtained from sensors selected from the group consisting of gamma-ray detectors, neutron density sensors, porosity sensors, sonic compressional slowness sensors, resistivity sensors, nuclear magnetic resonance, mechanical properties, inclination, azimuth, roll angles, and combinations thereof.

10. The method of claim 1, wherein the stochastic clustering and pattern matching agent is trained in a simulation environment.

11. The method of claim 10, wherein the simulation environment is produced by a training method comprising the steps of:
   a) providing a training earth model defining boundaries between formation layers and petrophysical properties of the formation layers in a subterranean formation comprising data selected from the group consisting of seismic data, data from an offset well and combinations thereof, and producing a set of model coefficients;
   b) providing a toolface input corresponding to the set of model coefficients to a drilling attitude model for determining a drilling attitude state;
   c) determining a drill bit position in the subterranean formation from the drilling attitude state;
   d) feeding the drill bit position to the training earth model, and determining an updated set of model coefficients for a predetermined interval and a set of signals representing physical properties of the subterranean formation for the drill bit position;
   e) inputting the set of signals to a sensor model for producing at least one sensor output and determining a sensor reward from the at least one sensor output;
   f) correlating the toolface input and the corresponding drilling attitude state, drill bit position, set of model coefficients, and the at least one sensor output and sensor reward in the simulation environment; and
   g) repeating steps b)-f) using the updated set of model coefficients from step d).

12. The method of claim 11, wherein the drilling attitude model is selected from the group consisting of a kinematic model, a dynamical system model, a finite element model, and combinations thereof.

13. The method of claim 1, wherein the output action is determined by maximizing the placement of the well path with respect to a geological datum.

14. The method of claim 13, wherein the geological datum is selected from the group consisting of a rock formation boundary, a geological feature, an offset well, an oil/water contact, an oil/gas contact, an oil/tar contact and combinations thereof.

15. The method of claim 1, wherein the output action is selected from the group consisting of curvature, roll angle, set points for inclination, set points for azimuth, Euler angle, rotation matrix quaternions, angle axis, position vector, position Cartesian, polar, and combinations thereof.

* * * * *